United States Patent
Krewinkel

(10) Patent No.: US 10,036,310 B2
(45) Date of Patent: Jul. 31, 2018

(54) EXHAUST-GAS TURBOCHARGER

(71) Applicant: BorgWarner Inc., Auburn Hills, MI (US)

(72) Inventor: Robert Krewinkel, Kerkrade (NL)

(73) Assignee: BorgWarner Inc., Auburn Hills, MI (US)

( * ) Notice: Subject to any disclaimer, the term of this patent is extended or adjusted under 35 U.S.C. 154(b) by 336 days.

(21) Appl. No.: 14/432,810

(22) PCT Filed: Oct. 2, 2013

(86) PCT No.: PCT/US2013/062947
§ 371 (c)(1),
(2) Date: Apr. 1, 2015

(87) PCT Pub. No.: WO2014/062372
PCT Pub. Date: Apr. 24, 2014

(65) Prior Publication Data
US 2015/0247449 A1    Sep. 3, 2015

(30) Foreign Application Priority Data
Oct. 15, 2012 (DE) .......... 10 2012 020 226

(51) Int. Cl.
| F02B 39/00 | (2006.01) |
| F02B 37/02 | (2006.01) |
| F01D 25/12 | (2006.01) |
| F01D 25/14 | (2006.01) |
| F02C 6/12 | (2006.01) |
| F02C 7/12 | (2006.01) |

(52) U.S. Cl.
CPC ........... *F02B 39/005* (2013.01); *F01D 25/12* (2013.01); *F01D 25/14* (2013.01); *F02B 37/025* (2013.01); *F02C 6/12* (2013.01); *F02C 7/12* (2013.01); *F05D 2220/40* (2013.01); *Y02T 10/144* (2013.01)

(58) Field of Classification Search
CPC ........ F02B 39/005; F01D 25/10; F01D 25/12; F02C 6/12; F05D 2220/40; F04D 25/082; F04D 29/5846; F04D 29/582; F15D 1/0015; F28F 13/12; B01F 5/0614; B01F 5/0615; B01F 5/0657
USPC ....................................... 366/339
See application file for complete search history.

(56) References Cited

U.S. PATENT DOCUMENTS

| 4,107,927 A * | 8/1978 | Gordon, Jr. ........... F01D 25/125 417/407 |
| 4,704,075 A * | 11/1987 | Johnston ............... F01D 25/125 417/407 |
| 5,161,960 A * | 11/1992 | Smith ................... F01D 25/125 184/6.11 |
| 2012/0269620 A1* | 10/2012 | Boening ................. F01D 25/24 415/203 |

FOREIGN PATENT DOCUMENTS

EP          1561826    * 10/2005    ............... C21B 7/10

* cited by examiner

*Primary Examiner* — Kenneth J Hansen
(74) *Attorney, Agent, or Firm* — Eric L. Doyle; Stephen A. Pendorf; Patent Central LLC

(57) ABSTRACT

An exhaust-gas turbocharger (1) having a housing (2) which comprises a turbine housing (3), a bearing housing (4) and a compressor housing (5); and having a cooling device (10) which is integrated at least in the turbine housing (3) and which has a cooling device inlet (16), wherein a coolant swirling device (13) is arranged at the cooling device inlet (16).

7 Claims, 2 Drawing Sheets

EXHAUST-GAS TURBOCHARGER

BACKGROUND OF THE INVENTION

Field of the Invention

The invention relates to an exhaust-gas turbocharger.

Description of the Related Art

To reduce the weight and costs of modern exhaust-gas turbochargers, it is known for the turbine housing thereof to be produced from lightweight materials, such as in particular aluminum. The greatest disadvantage of such housings consists in their low thermal durability, which necessitates effective cooling.

For this purpose, it is known to provide turbine housings with cooling devices which comprise channels and pockets in the housing. To set a suitable coolant flow, the diameter and the shape of said channels and pockets have been varied, though this is often not sufficient for effective cooling.

It is therefore an object of the present invention to provide an exhaust-gas turbocharger which comprises a turbine housing provided with an effective cooling device.

BRIEF SUMMARY OF THE INVENTION

According to the invention, through the provision of a coolant swirling device, deliberate swirling of the coolant can be realized in order to be able to utilize the resulting advantages of improved cooling, in particular of the turbine housing. In other words, the exhaust-gas turbocharger according to the invention is not dependent on a more or less random degree of swirling of the coolant supplied from the engine.

Such a coolant swirling device may be an integral constituent part of a cooling device which is arranged in the turbine housing or in principle also in the bearing housing and/or compressor housing, or it is possible for existing cooling devices to be provided with a swirling device as a retrofit part.

The dependent claims contain advantageous developments of the inventions.

In principle, it is possible for the swirling device to be provided with one continuously running coolant-guiding fin formed similarly to a screw thread or with a multiplicity of coolant-guiding fins with a wide variety of different shapes and dimensions. This is dependent on the desired degree of swirling, which may vary from application to application.

BRIEF DESCRIPTION OF THE SEVERAL VIEWS OF THE DRAWINGS

Further details, advantages and features of the present invention will emerge from the following description of exemplary embodiments with reference to the drawing, in which.

DETAILED DESCRIPTION OF THE INVENTION

Figure 1:
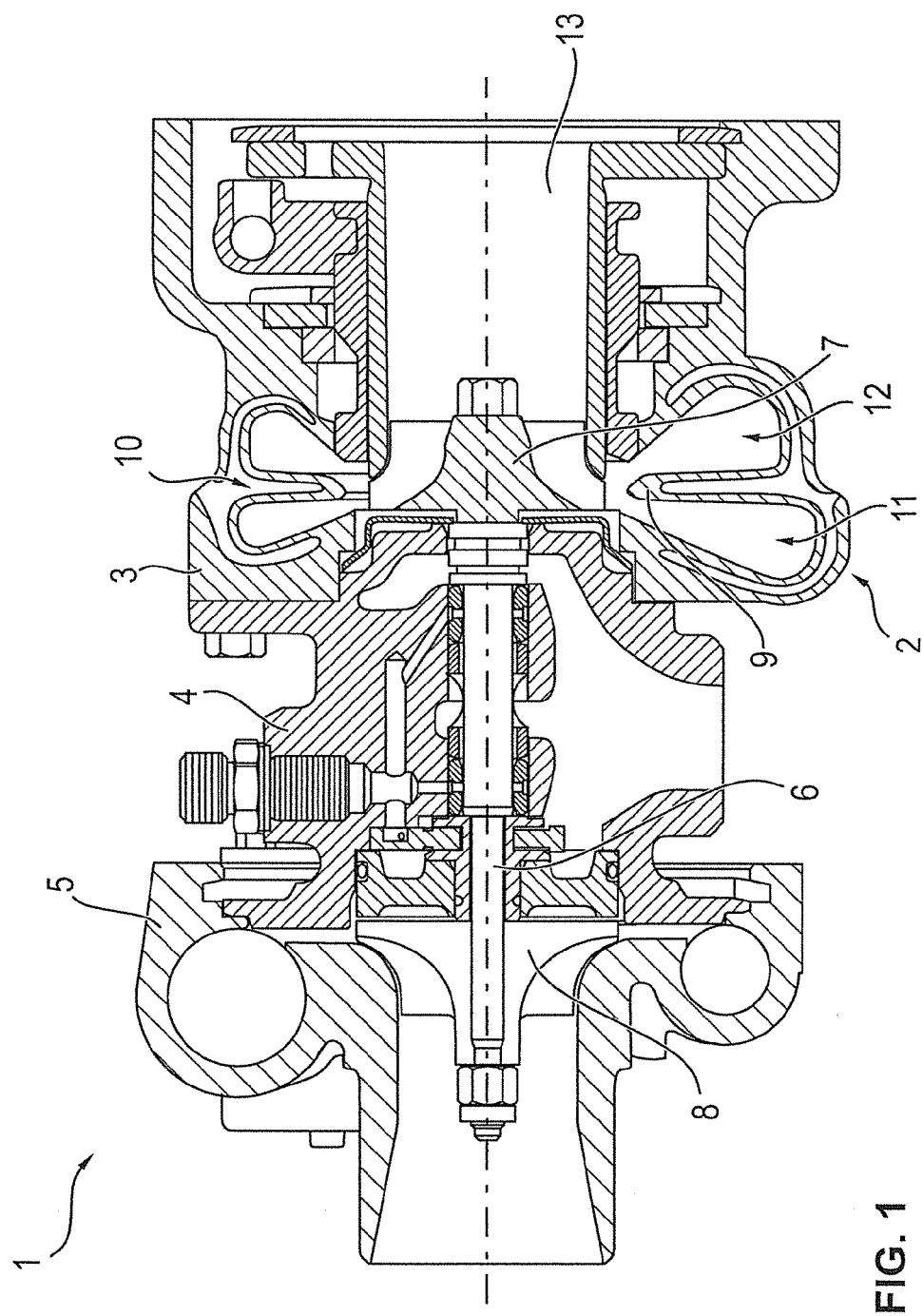
FIG. 1 shows a sectional illustration through an exhaust-gas turbocharger according to the invention.

FIG. 1 illustrates an exhaust-gas turbocharger 1 which has a housing 2. Here, the housing 2 comprises a turbine housing 3, a bearing housing 4 connected to the turbine housing, and a compressor housing 5 connected to the bearing housing 4.

In the bearing housing 4 there is mounted a shaft 6 which bears a turbine wheel 7 at the side of the turbine housing 3 and which bears a compressor wheel 8 at the side of the compressor housing 5.

In the example illustrated, the turbine housing 3 is a two-channel housing with a first and a second inflow channel 11 and 12, said inflow channels being separated by a partition 9.

To cool the turbine housing 3, a cooling device 10 is provided, the shape of which illustrated in FIG. 1 is merely exemplary. Such cooling devices 10 have channels and pockets for guiding a coolant, in particular water, and may be adapted to the turbine housing 3 depending on the design thereof.

Furthermore, it is possible in principle for such cooling devices 10 to also be provided in the bearing housing 4 and compressor housing 5.

Figure 2:
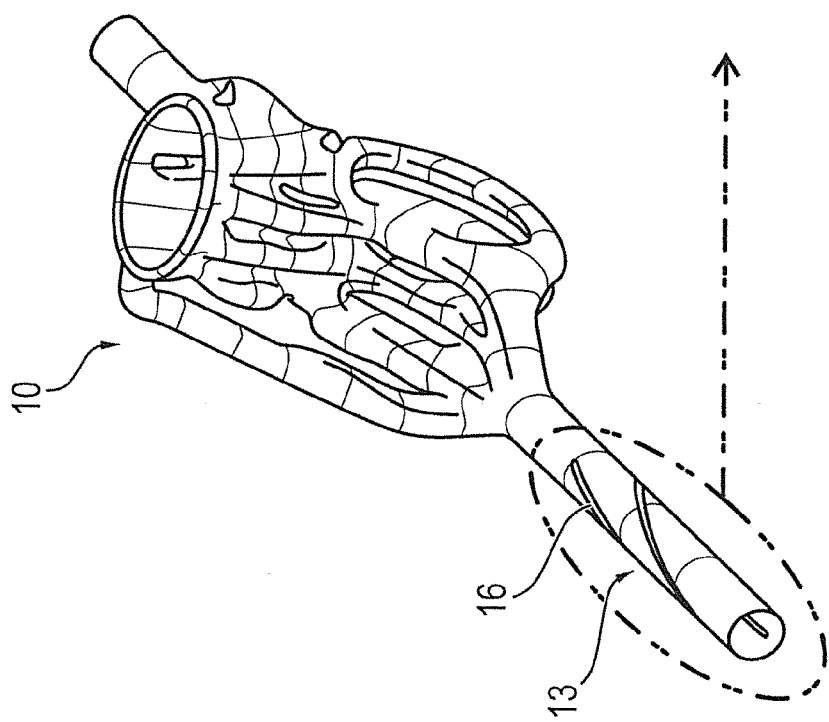
FIG. 2 shows a so-called "water core" for the exhaust-gas turbocharger as per FIG. 1.

FIG. 2 illustrates a so-called "water core" for the exhaust-gas turbocharger 1. The geometry illustrated in FIG. 2 represents a coolant-filled, in particular water-filled, cavity, as illustrated by way of example in FIG. 1, in the exhaust-gas turbocharger 1 in its finished state of production. The cooling device 10 or the water core thereof as per FIG. 2 should likewise be understood merely as an example, because the shaping of the cooling device may be adapted to the respective exhaust-gas turbocharger, as explained on the basis of FIG. 1.

In any case, the cooling device 10 has a cooling device inlet 16. As shown in FIG. 2, a coolant swirling device 13 is arranged at said cooling device inlet 16, such that coolant supplied to the cooling device 10 firstly flows through said swirling device 13 and is thus subjected to deliberate swirling, which considerably improves the efficiency of the cooling device 10.

Figure 3:
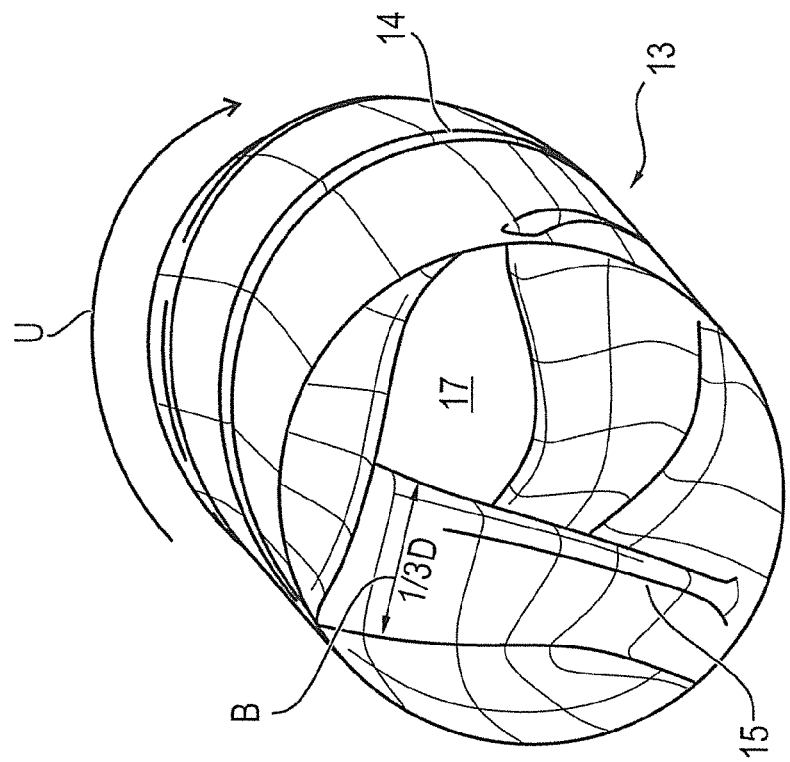
FIG. 3 shows an enlarged perspective illustration of a coolant swirling device.

FIG. 3 is an enlarged illustration of the swirling device 13. Here, FIG. 3 shows that the swirling device 13 has a tubular housing 14 with an interior 17 in which at least one flow-guiding fin 15 is arranged. As already explained in the introduction, it is possible according to the invention either for one such flow-guiding fin to be provided in the manner of a screw thread with a wrap angle U of preferably 180°, or for a multiplicity of such flow-guiding fins 15 to be arranged in the housing 14.

The geometry and dimensioning of such flow-guiding fins may be selected differently in accordance with the desired degree and desired manner of swirling. Merely by way of example, FIG. 3 shows a flow-guiding fin 15 with a width B which corresponds to one third of the inner diameter D of the housing 14 and has a diverting angle of approximately 45°.

The cooling device 10 is preferably used in a turbine housing 3, the material of which is for example aluminum.

It is thus possible according to the invention to utilize the advantages of such lightweight aluminum turbine housings and, in the process, to simultaneously permit effective cooling of the turbine housing.

In addition to the above written disclosure, reference is hereby explicitly made to the illustrative presentation of the invention in FIGS. 1 to 3.

LIST OF REFERENCE SIGNS

1 Exhaust-gas turbocharger
2 Housing
3 Turbine housing
4 Bearing housing

5 Compressor housing
6 Shaft
7 Turbine wheel
8 Compressor wheel
9 Partition
10 Cooling device
11, 12 First and second inflow channel
13 Swirling device
14 Tubular housing
15 Flow-guiding fin
16 Cooling device inlet
17 Interior
B Width
D Diameter of the housing 14

The invention claimed is:
1. An exhaust-gas turbocharger (1) having
a housing (2) which comprises
a turbine housing (3),
a bearing housing (4) and
a compressor housing (5); and
a cooling device (10)
which is integrated at least in the turbine housing (3) and
which has a cooling device inlet (16),
wherein
a coolant swirling device (13) is arranged at the cooling device inlet (16) wherein the swirling device (13) has a tubular housing (14) which is connected to the cooling device inlet (16), and wherein at least one flow-guiding fin (15) is arranged in the tubular housing (14) of the swirling device (13).

2. The exhaust-gas turbocharger as claimed in claim 1, wherein the at least one flow-guiding fin (15) is helical.

3. The exhaust-gas turbocharger as claimed in claim 2, wherein the at least one helical flow-guiding fin (15) has a wrap angle of less than or equal to 180°.

4. The exhaust-gas turbocharger as claimed in claim 1, wherein a multiplicity of flow-guiding fins (15) are arranged in the tubular housing (14).

5. The exhaust-gas turbocharger as claimed in claim 1, wherein the at least one flow guiding fin (15) has a width (B) which corresponds to approximately ⅓ of an inner diameter (D) of the tubular housing (14).

6. The exhaust-gas turbocharger as claimed in claim 1, wherein the swirling device (13) is formed as a retrofit part.

7. The exhaust-gas turbocharger as claimed in claim 1, the turbine housing (3) is formed of an aluminum material.

\* \* \* \* \*